George W. Brown
INVENTOR.

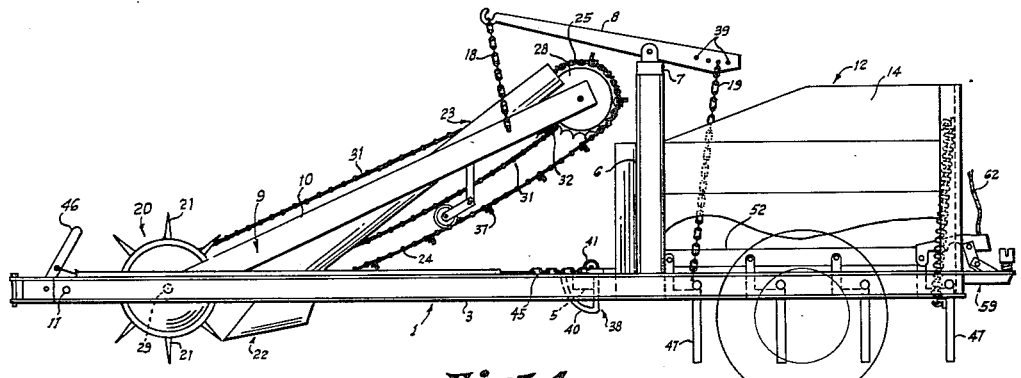
Aug. 28, 1962 — G. W. BROWN — 3,050,879
EARTH MOVING MACHINE
Filed May 15, 1961 — 2 Sheets-Sheet 1
George W. Brown
INVENTOR.
ATTORNEY Aug. 28, 1962 G. W. BROWN 3,050,879
EARTH MOVING MACHINE
Filed May 15, 1961 2 Sheets-Sheet 2

BY

ATTORNEY

United States Patent Office 3,050,879
Patented Aug. 28, 1962

3,050,879
EARTH MOVING MACHINE
George W. Brown, 3648 E. 1st St., Fort Worth, Tex.
Filed May 15, 1961, Ser. No. 110,105
3 Claims. (Cl. 37—8)

This invention relates to an earth moving machine, and it concerns more particularly a wheeled vehicle carrying a plow and having a load carrying bed positioned rearwardly of the plow, and having a traction wheel, independent of its supporting wheels, rotatable by frictional engagement with the ground upon forward movement of the vehicle, and an upwardly and rearwardly inclined belt conveyor driven by the traction wheel extending rearwardly of the plow, between the plow and the load carrying bed, arranged to receive increments of loose earth as displaced by the plow and deposit it on the load carrying bed.

The invention contemplates an earth moving machine as described having an elongated frame supported rearwardly thereof on a pair of wheels and adapted to be towed by a tractor vehicle, and having a sub-frame carrying the plow, the traction wheel, and the conveyor pivotally connected at one end to the frame, whereby the opposite end of the sub-frame is adapted to be raised and lowered, and in which the plow and the traction wheel are adapted to be disengaged from the ground when said opposite end of the sub-frame is in its raised position.

The invention further contemplates such an earth moving machine in which the load carrying bed has its rearward end pivotally connected to the frame, rearwardly thereof, whereby its forward end is adapted to be raised and lowered, the forward end of the load carrying bed being supported on the frame in its lowermost position, and having a beam arranged longitudinally of the frame and fulcrumed intermediate its ends on an upward extension thereof, the beam having its opposite ends connected by linkage to the forward end of the load carrying bed and the end of the sub-frame opposite its pivot, respectively, whereby said end of the sub-frame is adapted to be raised, to thereby disengage the plow and the traction wheel from the ground, upon downward movement of the forward end of the load carrying bed in response to a load of predetermined weight deposited on the load carrying bed, and a latch on the frame engageable with the forward end of the load carrying bed to secure it in its lowermost position.

The invention also contemplates an earth moving machine as described in which the bottom of the load carrying bed is formed by a series of rectangular doors, each having a length corresponding to the width of the load carrying bed, arranged in side by side relation to each other and each having a pivotal support along one of its longitudinal edges whereby it is adapted to be swung downwardly, by gravity, to an open position, the doors each having an angular member rigidly connected thereto and having an end portion extending upwardly therefrom, adjacent its pivotal support, in its closed position, whereby the doors are movable about their pivotal supports by pivotal movement of the angular members, and having an elongated, reciprocally movable bar extending longitudinally of the load carrying bed, transversely of the doors, pivotally connected to the upstanding end portions of the angular members, whereby the doors are adapted to be opened and closed in unison upon reciprocal movement of the bar and simultaneous pivotal movement of the angular members, a first link having one of its ends pivotally connected to the rearward end of the load carrying bed, exteriorly thereof, a second link having one of its ends pivotally connected to the rearward end of the bar, the first link having its other end pivotally connected to the second link intermediate its ends, and the second link extending thru an opening in the rear wall of the load carrying bed in its forwardly extending position, whereby the bar is movable longitudinally in opposite directions, to thereby open and close the doors, upon simultaneous pivotal movement of the links, a tension spring acting on the rear wall of the load carrying bed and one of the angular members to bias the doors in their closed positions, and a latch on the rearward end of the load carrying bed, exteriorly thereof, engageable with one of the links to secure the links in their rearwardly extending positions, substantially in longitudinal alignment with the bar, whereby the doors are positively closed.

An object of the invention is to provide an earth moving machine as described which is adapted to be employed in a variety of earth moving operations, such as trench digging, filling, leveling, sodding, fertilizer spreading, and the like.

Another object of the invention is to provide such an earth moving machine in which the linkage connecting the forward end of the load carrying bed to the adjacent end of the beam is adjustable longitudinally relative to the beam to thereby determine the weight of a load deposited on the load carrying bed which is sufficient to rotate the beam about its pivot to thereby raise the end of the sub-frame opposite its pivot whereby the plow and the friction wheel are disengaged from the ground.

A still further object of the invention is to provide such an earth moving machine in which the latch securing the front end of the load carrying bed in its loowermost position, and the latch securing the links in their rearwardly extending positions, each have flexible linkage acting thereon whereby the latches are releasable by pulling the flexible linkage.

The invention contemplates that in a modified form thereof the latches may be released electrically by means of a pair of solenoids each acting on one of the latches and controlled by a push button switch.

The invention will be readily understood by referring to the following description and the accompanying drawing, in which:

FIG. 1 is a side elevational view, partly broken away to show details of construction, of an earth moving machine embodying the invention, showing it in one of its operating positions;

FIG. 2 is a view similar to FIG. 1, showing the machine in another of its operating positions;

FIG. 3 is a front elevational view;

FIG. 4 is a fragmentary elevational view, on an enlarged scale, showing portions of the apparatus illustrated in FIGS. 1 and 2;

Figure 6:
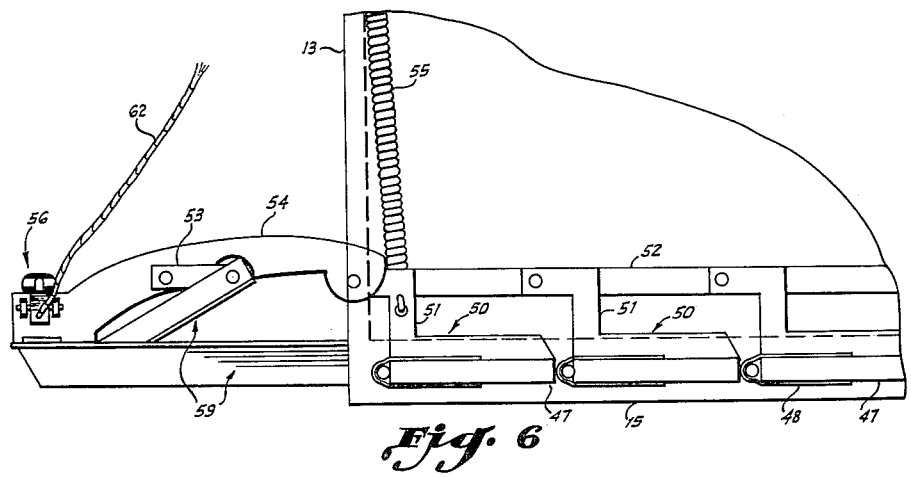
Figure 5:
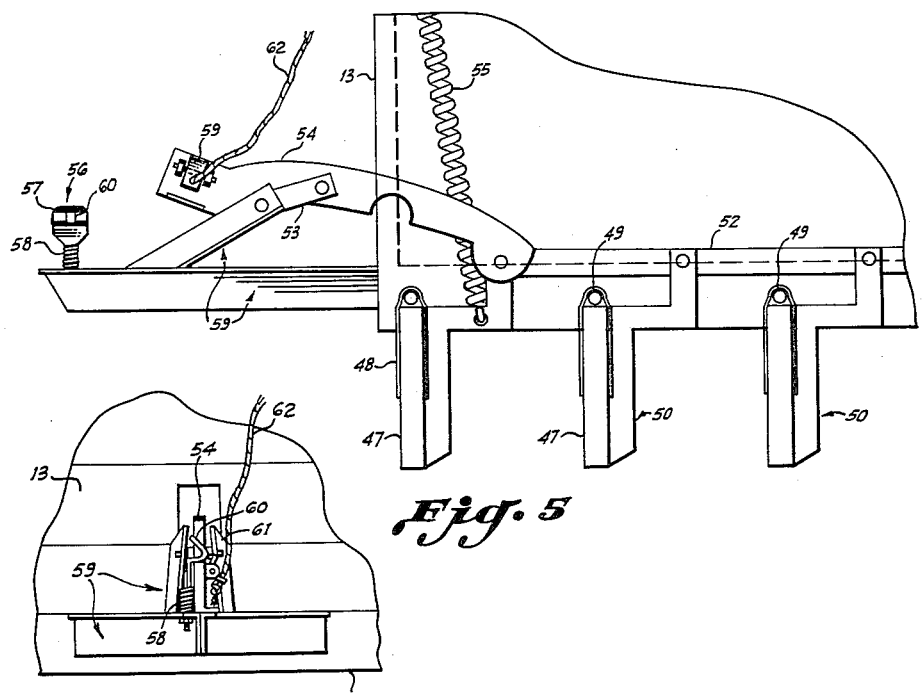
Figure 7:
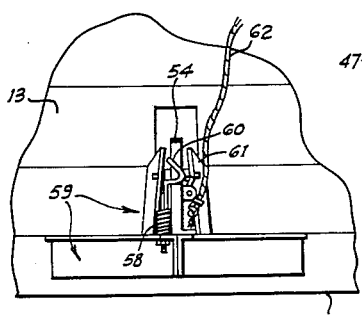

FIGS. 5 and 6 are fragmentary elevational views, on an enlarged scale, taken from the side of the machine opposite the side shown in FIGS. 1 and 2, showing, respectively, portions of the apparatus as illustrated therein; and FIG. 7 is a fragmentary rear elevational view showing portions of the apparatus illustrated in FIGS. 5 and 6.

Referring to the drawing, the earth moving machine of the invention comprises a wheeled vehicle having an elongated frame, designated generally by the numeral 1, which is supported rearwardly thereof on a pair of wheels 2 and is adapted to be towed by a tractor vehicle.

The frame 1 has a pair of elongated side members 3, the forward ends of which converge and are connected to each other, and which has its rearward ends arranged in substantially parallel, spaced apart relation to each other.

The side members 3 are connected intermediate their ends by a cross bar 5, shown in dotted lines in FIG. 1.

The frame 1 has an upward extension intermediate its ends, rearwardly of the cross bar 5, consisting of a pair of vertically extending side rails 6, which are arranged parallel to each other, on opposite sides of the frame 1, and are connected at their lower ends to the side members 3, and a top rail 7 having its ends connected to the upper ends of the side rails 6.

A beam 8, which is arranged longitudinally of the frame 1, is fulcrumed intermediate its ends on the top rail 7.

An elongated sub frame, indicated generally by the numeral 9, which is relatively shorter and narrower than the frame 1, is arranged between the side members 3 of the frame 1. The sub-frame 9 has a pair of elongated side members 10 which are pivotally connected at their forward ends to the side members 3 of the frame 1, forwardly thereof, as at 11, whereby the rearward end of the sub-frame 9 is adapted to be raised and lowered.

A load carrying bed, indicated generally by the numeral 12, which is relatively shorter and narrower than the frame 1, is arranged between the side members 3 of the frame 1, rearwardly of the sub-frame 9.

The load carrying bed 12, which has a bottom structure as hereinafter described, is open at the front and has a rear wall 13 and a pair of side walls 14.

The load carrying bed 12 has a bottom frame including a pair of side members 15 and a pair of end members 16. The side members 15 are pivotally connected at their rearward ends to the side members 3 of the frame 1, rearwardly thereof, as at 17, whereby the forward end of the load carrying bed 12 is adapted to be raised and lowered.

The rearward end of the sub-frame 9 and the forward end of the load carrying bed 12 are connected by linkage 18 and 19, respectively, to opposite ends of the beam 8, whereby the rearward end of the sub-frame 9 and the forward end of the load carrying bed 12 are adapted to be raised and lowered inversely upon movement of the beam 8 about its pivot.

The forward end of the load carrying bed 12 is supported on the cross bar 5 in its lowermost position.

A traction wheel 20, which has circumferentially spaced lugs 21 extending radially outwardly from its peripheral surface, is rotatably mounted on the sub-frame 9, between its side members 10, intermediate its ends.

The traction wheel 20 is engageable with the ground, whereby the rearward end of the sub-frame 9 is supported in its lowermost position, and is rotatable in response to forward movement of the vehicle.

A plow 22, which is mounted on the sub-frame 9, between its side members 10, rearwardly of the traction wheel 20, is engageable with the ground in the lowermost position of the rearward end of the sub-frame 9.

An endless belt conveyor, indicated generally by the numeral 23, is mounted on the sub-frame 9, between its side members 10, laterally of the plow 22, and extends rearwardly of the plow 22, between the plow 22 and the load carrying bed 12. The conveyor 23 is inclined upwardly and rearwardly, and is arranged to receive increments of earth as displaced by the plow and deposit it on the load carrying bed 12.

The conveyor 23 is driven by a chain belt 24, which is operatively connected to a pair of sprockets 25, only one of which is shown, carried by rotatable shafts, one of which is designated by the numeral 27, the ends of which are journaled in bearings carried by the side members 10. The shafts 27 also have pulley wheels 28 thereon supporting opposite ends of the conveyor 23.

The traction wheel 20 is mounted on a shaft 29 having its ends journaled in bearings carried by the side members 10. A sprocket 30, which is connected to the shaft 29, is connected by a chain belt 31 to a sprocket 32, which is connected to a stub shaft 33 having one of its ends journaled in a bearing carried by one of the side members 10.

A gear 34, which is connected to the stub shaft 33 and rotates therewith, meshes with a gear 35 which is connected to the rearward shaft 27, whereby the shaft 27, which drives the conveyor 23, is rotatable in the opposite direction in response to rotation of the traction wheel 20.

The conveyor 23 includes an endless belt 36 having a plurality of longitudinally spaced lugs 37 connected thereto and extending outwardly therefrom, perpendicular to its peripheral surface, for engagement with increments of earth as deposited on the belt 36, upon displacement thereof by the plow 22, whereby it is positively movable with the belt 36 and is discharged therefrom on the load carrying bed 12.

The rearward end of the sub-frame 9 is adapted to be raised, to thereby disengage the plow 22 and the traction wheel 20 from the ground, upon downward movement of the forward end of the load carrying bed 12 in response to a load predetermined weight deposited on the load carrying bed 12.

A latch on the frame 1, designated generally by the numeral 38, is engageable with the forward end of the load carrying bed 12 to secure it in its lowermost position.

A plurality of longitudinally spaced holes 39 in the beam 8, rearwardly of its pivot, are selectively engageable by the linkage 19 whereby the linkage 19 is adjustable longitudinally relative to the beam 8 to thereby determine the weight of a load deposited on the load carrying bed 12 which is sufficient to rotate the beam 8 about its pivot to thereby raise the rearward end of the sub-frame 9 whereby the plow 22 and the traction wheel 20 are disengaged from the ground.

The latch 38 includes a C-shaped element 40 which partially encircles the cross bar 5 and is pivotally connected intermediate its ends to the cross bar 5 whereby it is movable pivotally in the vertical plane, as shown in FIG. 4. The open side of the C-shaped element 40 faces upwardly, and has a roller 41 on its upstanding rearward end portion which extends forwardly therefrom and, in one rotative position of the C-shaped element 40, as shown in FIG. 4, is engageable over an adjacent edge portion of an abutment 42 on the load carrying bed 12, forwardly thereof.

A lever 43, which is pivotally connected intermediate its ends to the cross bar 5 whereby it is movable pivotally in the horizontal plane, as shown in FIG. 4, is pivotally connected at one of its ends to the upstanding forward end portion of the C-shaped element 40, opposite the roller 41, whereby the roller 41 is adapted to be disengaged from the abutment 42, to thereby release the load carrying bed 12, upon pivotal movement of the C-shaped element 40 in response to pivotal movement of the lever 43.

The roller 41 is biased in its forward position, in engagement with the abutment 42, as shown in FIG. 4, by spring means (not shown) acting on the lever 43, whereby the forward end of the load carrying bed 12 is adapted to be secured in its lowermost position.

An armored flexible cable 44 has one of its ends connected by a chain 45 to the end of the lever 43 opposite the C-shaped element 40, whereby the latch 38 is releasable by pulling a lever 46 connected to the opposite end of the flexible cable 44.

The bottom of the load carrying bed 12 is formed by a series of rectangular doors 47, each having a length corresponding to the width of the load carrying bed 12, which are arranged in side by side relation to each other.

The doors 47 have metal straps 48 looped about their ends whereby they are each rigidly connected along one of their longitudinal edges to one of a series of parallel shafts 49 having their ends journaled in bearings carried by the side members 15 of the load carrying bed 12.

The doors 47 are adapted to be swung downwardly about the respective shafts 49, by gravity, to open positions in which they are disposed substantially vertically, depending from the shafts 49.

A plurality of angular members 50 are rigidly connected to the top sides of the doors 47, respectively, in their closed positions, intermediate the ends thereof. The angular members 50 each have an end portion 51 which extends upwardly from one of the doors 47, adjacent the corresponding shaft 49, in the closed positions of the doors 47, whereby the doors 47 are movable pivotally about the shafts 49 by pivotal movement of the angular members 50.

An elongated, reciprocally movable bar 52, which extends longitudinally of the load carrying bed 12, transversely of the doors 47, is pivotally connected to the upstanding end portions 51 of the angular members 50, whereby the doors 47 are adapted to be opened and closed in unison upon reciprocal movement of the bar 52 and simultaneous pivotal movement of the angular members 50.

A first link 53, which has one of its ends pivotally connected to a rearward extension of the rearward end member 16 of the load carrying bed 12, has its opposite end pivotally connected to a second link 54 intermediate its ends. The second link 54 has one of its ends pivotally connected to the rearward ends of the bar 52.

The second link 54 extends thru an opening in the rear wall 13 of the load carrying bed 12 in its forwardly extending position.

The bar 52 is movable longitudinally in opposite directions, to thereby open and close the doors 47, upon simultaneous pivotal movement of the links 53 and 54.

A tension spring 55 acts on the rear wall 13 of the load carrying bed 12 and one of the angular members 50 to bias the doors 47 in their closed positions.

A latch, designated generally by the numeral 56, is engageable with the end of the second link 54 opposite the bar 52 to secure the links 53, 54 in their rearwardly extending positions, substantially in longitudinal alignment with the bar 52, whereby the doors 47 are positively closed.

The latch 56 includes a shaped plate 57 which is connected by an upstanding spring tensioned bolt 58 to a bracket 59 secured to the rear end member 16 of the load carrying bed 12 and forming a rearward extension thereof. The bracket 59 includes a pair of rigid supports positioned on opposite sides of the links 53, 54 in their rearwardly extending positions.

The plate 57 has an abutment 60 thereon which is receivable in a slot therefor in the upper edge of the link 54, rearwardly thereof, whereby the link 54 is secured in its rearwardly extending position. A lever 61, which is pivotally connected to the link 54, in opposed relation to the slot, is engageable with the abutment 60 to displace it from the slot upon movement of the lever 61 about its pivot.

A rope 62 has one of its ends pivotally connected by the lever 61 to the link 54, whereby the lever 61 is movable about its pivot to release the latch 56, and the links 53 and 54 are movable simultaneously about their pivots to thereby move the bar 52 forwardly and permit the doors 47 to open, by gravity, by pulling the rope 62.

In a modified form of the invention the latches 38 and 56 advantageously may be operable electrically by means of solenoids (not shown) controlled by push button switches.

The invention may be modified in various ways without departing from the spirit and scope thereof.

I claim:

1. An earth moving machine comprising a wheeled vehicle carrying a plow and having a load carrying bed positioned rearwardly of the plow, and having a traction wheel, independent of its supporting wheels, rotatable by frictional engagement with the ground upon forward movement of the vehicle, and an upwardly and rearwardly inclined belt conveyor driven by the traction wheel extending rearwardly of the plow, between the plow and the load carrying bed, arranged to receive increments of loose earth as displaced by the plow and deposit it on the load carrying bed, the wheeled vehicle having an elongated frame supported rearwardly thereof on a pair of wheels and adapted to be towed by a tractor vehicle, and having a sub-frame carrying the plow, the traction wheel, and the conveyor pivotally connected at one end to the frame, whereby the opposite end of the sub-frame is adapted to be raised and lowered, the plow and the traction wheel being adapted to be disengaged from the ground when said opposite end of the sub-frame is in its raised position, the load carrying bed having its rearward end pivotally connected to the frame, rearwardly thereof, whereby its forward end is adapted to be raised and lowered, the forward end of the load carrying bed being supported on the frame in its lowermost position, a beam arranged longitudinally of the frame and fulcrumed intermediate its ends on an upward extension thereof, the beam having its opposite ends connected by linkage to the forward end of the load carrying bed and the end of the sub-frame opposite its pivot, respectively, whereby said end of the sub-frame is adapted to be raised, to thereby disengage the plow and the traction wheel from the ground, upon downward movement of the forward end of the load carrying bed in response to a load of predetermined weight deposited on the load carrying bed, and a latch on the frame engageable with the forward end of the load carrying bed to secure it in its lowermost position.

2. The structure of claim 1, the bottom of the load carrying bed being formed by a series of rectangular doors, each having a length corresponding to the width of the load carrying bed, arranged in side by side relation to each other and each having a pivotal support along one of its longitudinal edges whereby it is adapted to be swung downwardly, by gravity, to an open position, the doors each having an angular member rigidly connected thereto and having an end portion extending upwardly therefrom, adjacent its pivotal support, in its closed position, whereby the doors are movable about their pivotal supports by pivotal movement of the angular members, an elongated, reciprocally movable bar extending longitudinally of the load carrying bed, transversely of the doors, pivotally connected to the upstanding end portions of the angular members, whereby the doors are adapted to be opened and closed in unison upon reciprocal movement of the bar and simultaneous pivotal movement of the angular members, a first link having one of its ends pivotally connected to the rearward end of the load carrying bed, exteriorly thereof, a second link having one of its ends pivotally connected to the rearward end of the bar, the first link having its other end pivotally connected to the second link intermediate its ends, and the second link extending thru an opening in the rear wall of the load carrying bed in its forwardly extending position, whereby the bar is movable longitudinally in opposite directions, to thereby open and close the doors, upon simultaneous pivotal movement of the links, a tension spring acting on the rear wall of the load carrying bed and one of the angular members to bias the doors in their closed positions, and a latch on the rearward end of the load carrying bed, exteriorly thereof, engageable with the second link to secure the links in their rearwardly extending positions, substantially in longitudinal alignment with the bar, whereby the doors are positively closed.

3. The structure of claim 1, the linkage connecting the forward end of the load carrying bed to the adjacent end of the beam being adjustable longitudinally relative to the beam to thereby determine the weight of a load deposited on the load carrying bed which is sufficient to rotate the beam about its pivot to thereby raise the end of the subframe opposite its pivot whereby the plow and the traction wheel are disengaged from the ground.

References Cited in the file of this patent

UNITED STATES PATENTS

| 7,723 | Sprague | Oct. 15, 1850 |
| 23,723 | Stillson | Apr. 19, 1859 |
| 72,098 | Slusser | Dec. 10, 1867 |
| 129,154 | McKinley | July 16, 1872 |
| 349,685 | Botsford | Sept. 28, 1886 |